T. L. BRIGGS & H. F. MERRIAM.
APPARATUS FOR THE MANUFACTURE OF FUMING SULFURIC ACID, OR OLEUM.
APPLICATION FILED AUG. 11, 1910.
1,082,301.
Patented Dec. 23, 1913.
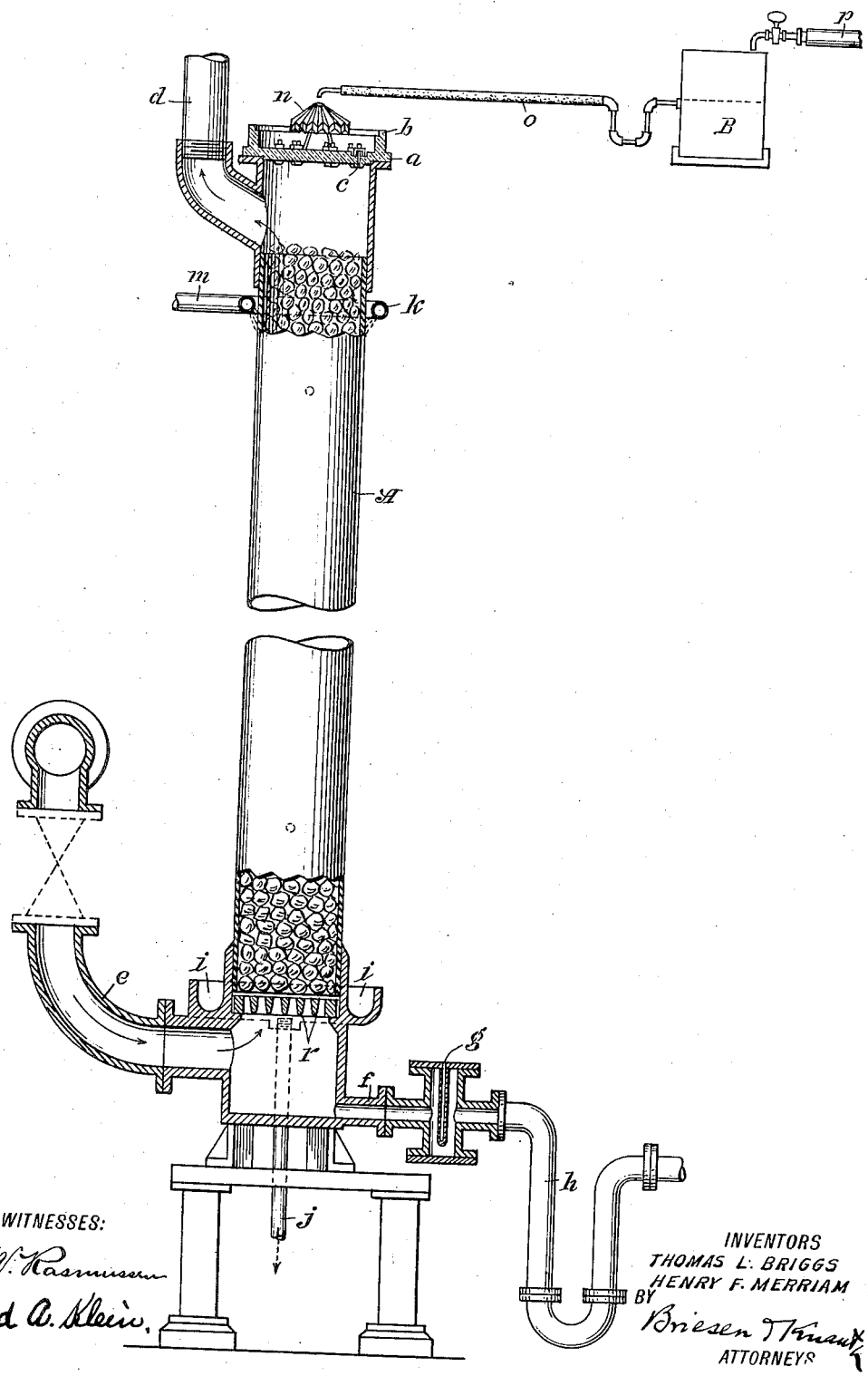
WITNESSES:
INVENTORS
THOMAS L. BRIGGS
HENRY F. MERRIAM
BY
ATTORNEYS

UNITED STATES PATENT OFFICE.

THOMAS LYNTON BRIGGS, OF FLUSHING, NEW YORK, AND HENRY F. MERRIAM, OF SUMMIT, NEW JERSEY, ASSIGNORS TO GENERAL CHEMICAL COMPANY, OF NEW YORK, N. Y., A CORPORATION OF NEW YORK.

APPARATUS FOR THE MANUFACTURE OF FUMING SULFURIC ACID OR OLEUM.

1,082,301. Specification of Letters Patent. Patented Dec. 23, 1913.

Application filed August 11, 1910. Serial No. 576,713.

*To all whom it may concern:*

Be it known that we, THOMAS LYNTON BRIGGS, a subject of the King of Great Britain, and resident of Flushing, county of Queens, State of New York, and HENRY F. MERRIAM, a citizen of the United States, and resident of Summit, county of Union, State of New Jersey, have jointly invented certain new and useful Improvements in Apparatus for the Manufacture of Fuming Sulfuric Acid or Oleum, of which the following is a specification.

Our invention relates to an improved apparatus for the manufacture of fuming sulfuric acid, or oleum, as it is sometimes called, which is so conditioned as to prevent the escape of sulfuric anhydrid into the atmosphere.

The object of our invention is to provide means for the production of oleum which may be depended upon to give uniform and unvarying results.

The main object, however, is to provide an apparatus by means of which the absorption of $SO_3$ by sulfuric acid of a strength between 97 and 99.5% (absolute $H_2SO_4$) shall be complete so that there is no excess of $SO_3$ to escape into the atmosphere and consequently no damage to surrounding property and to the health and comfort of the vicinage. Our apparatus is illustrated in the drawings which represent an elevation, partly in section, of the said apparatus.

In the drawings A is a tower or upright tube having at the top thereof a head $a$ which is provided with a peripheral upstanding flange $b$ while its bottom is pierced with holes $c$. At one side of the tower near its top is an opening from which leads an outlet or air-discharge pipe $d$.

The tower near its bottom has an inlet pipe $e$ for the incoming gas and, still nearer the bottom, a smaller outlet pipe $f$ leading therefrom through a thermometer pocket $g$ and thence to a siphon trap $h$ for the outgoing oleum. Above the inlet pipe $e$ the tower has a circumferential channel or trough $i$, having a discharge pipe $j$. The upper part of the tower is surrounded by a ring $k$ of piping pierced with a series of small holes and connected to a suitable supply pipe $m$. Supported centrally above the head $a$ is a distributing device $n$ preferably made of baked clay, glass, porcelain or other suitable material inert to the action of acid. The distributer is umbrella shaped as shown and is channeled or grooved to distribute the acid in equal streamlets. Supported at a suitable height adjacent to the top of the tower A is a tank B provided with an outlet pipe $o$ forming a trap and terminating above the center of the distributer $n$. A pipe $p$ provided with a spigot is connected to main receptacle (not shown) containing sulfuric acid. Within the lower part of the tower A above the pipe $e$ is a grate $r$ upon which, before the apparatus is operated, a packing of pebbles, broken quartz or similar acid inert material is placed, extending preferably to the pipe $d$.

In order to insure proper operation and complete absorption of $SO_3$, in carrying out our process commercially, we make the tower of about 14 inches inside diameter by approximately 14 feet high from the grate $r$ to the head $a$. With this tower we have obtained most satisfactory results and have produced oleum, without creating a cloud, continuously and automatically. These proportions are entirely unusual; they provide for a short ascent of the gases, and a consequent prompt absorption which is dependent on the ability of the cooling medium to affect all the contents of the tower.

The operation of the apparatus is as follows: The acid having a strength of from 97 to 99.5% absolute $H_2SO_4$, being turned on, fills the tank B to a suitable level and thence flows through the pipe $o$ at a regulated rate (determined by the bore of the pipe or by a cock which may be inserted therein) and drops upon the center of the distributer $n$ from which it flows to and through the holes $c$ in substantially uniform streamlets upon the packing of quartz or equivalent material supported by the grate $r$ within the tower. Reaching said quartz the acid slowly spreads over its multitudinous surfaces and, as a thin film or great total area, gradually works its way toward the bottom of the tower. Through the pipe $e$ which has been previously connected to a source of sulfuric anhydrid ($SO_3$), this gas is caused to enter the base of the tower below the grate $r$ by a suitable blower, not shown, in admixture with air at a strength of preferably between 4 and 8 per cent. $SO_3$ by volume, this gas meeting in its ascent the down-flowing film of $H_2SO_4$ and combining therewith. With proper regulation of the temperature, all the $SO_3$ will be combined with the $H_2SO_4$ before the former reaches the top of the tower so that there will be no excess of $SO_3$ escaping through the pipe $d$. There will be, however, an uncombined mixture of air and other gas or gases that were brought in with the supplied $SO_3$ and this is permitted to escape through the pipe $d$. We call this carrier of $SO_3$ "air" in this specification.

To effect the above complete combination of $H_2SO_4$ and $SO_3$ to produce oleum, i. e. fuming sulfuric acid, it is necessary, as above stated to fix exactly the amount of $H_2SO_4$ and $SO_3$ supplied to the tower in a given time as also the temperature at which the combination is to take place. As considerable heat is developed in the reaction, which if not removed, would mar the process, it becomes a problem of cooling or abstracting heat from the tower. We accomplish this by supplying the pipe ring $k$ through supply pipe $m$ with a regulated amount of water or other cooling fluid from any suitable source. This water, or other cooling fluid, is evenly distributed around the periphery of the tower by means of the holes in the ring $k$ and flows along the outer wall of the tower into the trough $i$ from whence it passes away by pipe $j$. More than one ring $k$ may be used if desired. By causing the flow of water to be greater or less, suitable reference being always had to its temperature, it is clear that heat will be abstracted from within the tower and the temperature of reaction correspondingly controlled.

With acid of a strength of 99% entering the top of the tower at a temperature of 58° F., and with the anhydrid having a strength of 5.4% at the blower, and with water supplied at a temperature of 34° F., and the temperature of the gas containing sulfuric anhydrid entering the tower at 246° F., the air escaping at the discharge pipe $d$ was found to be 46° F., while the 20% oleum escaped through the pipe $f$ at a temperature of 150° F. The escaping air in the pipe $d$ is free from $SO_3$ and does not, therefore, contaminate the neighborhood as had been the case in former efforts to combine $SO_3$ with $H_2SO_4$ of the strength specified so as to produce the fuming acid or oleum. Never before our invention was the $SO_3$ completely absorbed in making fuming acid.

The temperature maintained within the tower is as has been shown, regulated in such manner that it is maintained below that at which $SO_3$ would be given off by oleum and above that at which $H_2SO_4$ will not absorb $SO_3$. It is, of course, important that the temperature regulating water or other substance shall be near enough to the hottest part of the tower during operation as to control the temperature throughout the tower. Hence we have found that the tower should in the illustration given, leave about 7 inches between the central part and the cooled outer part of the tower. The oleum resulting from the process passes off at the bottom of the tower through the pipe $f$ and siphon trap $h$.

The use of a trap in the acid supply $o$, as also that of trap $h$ in the outlet pipe $f$ at the bottom of the tower insures a more uniform flow of the incoming and outgoing fluids; it also provides a seal for said pipes in case of any cessation of operations at any time.

By calculating the respective proportions heretofore given, it will be found that for each cubic inch of effective tower space, meaning that part of the tower which lies between the grate and the top of the packing, the apparatus should have approximately $\frac{1}{3}$ of a square inch of lateral cooling surface.

We regard the above mentioned proportions to be of great importance as it has been found that through them, and through them only, can the result of complete absorption of $SO_3$ be obtained so that neither it, nor any part of it may contaminate the surrounding atmosphere. These proportions, as will be observed, show that the effective part of the tower is substantially 11 times as high as its diameter, or in lieu of diameter, as twice the distance reached by the cooling medium, which is given as substantially 7 inches.

The process above described, in connection with this apparatus, is claimed by us in our copending application, Serial No. 576,714, filed August 11, 1911.

We claim:

1. In an apparatus for manufacturing fuming sulfuric acid, the combination of a distributer arranged to divide incoming acid into streamlets, with a tower arranged to receive these streamlets at the top and incoming gases near the bottom, said tower being provided with an outlet near the top for air, with another outlet near the bottom for oleum and with means for cooling the contents of the tower, said tower being so proportioned that there shall be, substantially, one square inch of lateral cooling surface for every three cubic inches of effective tower space.

2. A tower for converting sulfuric acid and sulfuric anhydrid into oleum, said tower being provided with an outlet for air near its top, with a grate carrying packing extending substantially to the height of said outlet and with means for cooling the contents of the tower, said tower being so proportioned that there shall be substantially one square inch of lateral cooling surface for every three cubic inches of effective tower space.

3. The combination of the distributer $n$, the perforated plate $a$, the tower A carrying said plate, the grate in said tower, gas inlet in the lower part of the tower, oleum outlet pipe in the lowest part of the tower, air outlet pipe in the upper part of the tower, packing within the tower extending substantially to the air outlet pipe and cooling means on the outside of the tower, the tower being so proportioned that there shall be substantially one square inch of lateral cooling surface for every three cubic inches of effective tower space.

4. In an apparatus for converting sulfuric acid and sulfuric anhydrid into oleum, a tower through which the anhydrid and acid are passed, packing within said tower and means for cooling the tower from the outside, the proportions of the parts being so arranged that there shall be substantially, one square inch of lateral cooling surface for every three cubic inches of effective tower space.

In testimony whereof we have hereunto set our hands in the presence of two subscribing witnesses.

THOMAS LYNTON BRIGGS.
HENRY F. MERRIAM.

Witnesses:
FRED A. KLEIN,
R. ABERLI.